US010393453B2

United States Patent
Duquennoy et al.

(10) Patent No.: US 10,393,453 B2
(45) Date of Patent: Aug. 27, 2019

(54) METHOD FOR DETECTING DEFICIENCIES IN A COOLING TOWER OF A THERMAL FACILITY IN OPERATION

(71) Applicant: Electricite de France, Paris (FR)

(72) Inventors: Christophe Duquennoy, Crolles (FR); Claude Wolf, Molsheim (FR); Véronique Charrel, Claix (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 15/548,733

(22) PCT Filed: Feb. 19, 2016

(86) PCT No.: PCT/FR2016/050381
§ 371 (c)(1),
(2) Date: Aug. 3, 2017

(87) PCT Pub. No.: WO2016/132079
PCT Pub. Date: Aug. 25, 2016

(65) Prior Publication Data
US 2018/0031339 A1    Feb. 1, 2018

(30) Foreign Application Priority Data
Feb. 19, 2015   (FR) ..................................... 15 51439

(51) Int. Cl.
| | | |
|---|---|---|
| *F28C 1/02* | (2006.01) | |
| *F28B 11/00* | (2006.01) | |
| *F28F 27/00* | (2006.01) | |
| *G05B 23/02* | (2006.01) | |
| *G06F 21/52* | (2013.01) | |

(52) U.S. Cl.
CPC ............ *F28F 27/003* (2013.01); *F28B 11/00* (2013.01); *F28C 1/02* (2013.01); *G05B 23/0254* (2013.01);
(Continued)

(58) Field of Classification Search
CPC ................................ F28F 27/003; F28B 11/00
See application file for complete search history.

(56) References Cited

U.S. PATENT DOCUMENTS 4,449,368 A * 5/1984 Haynie ................. F01K 9/003
60/652
2002/0173929 A1* 11/2002 Seigel ..................... F24F 11/30
702/130
(Continued)

FOREIGN PATENT DOCUMENTS

| EP | 2114081 | 11/2009 |
| EP | 2787296 | 10/2014 |

OTHER PUBLICATIONS

International Standard ISO 16345, First Edition, ISO copyright office, ISO 2014.*
(Continued)

*Primary Examiner* — Michael J Dalbo
(74) *Attorney, Agent, or Firm* — Womble Bond Dickinson (US) LLP

(57) ABSTRACT

The invention relates to a method for detecting deficiencies in a cooling tower (2) of a thermal facility (1) in operation in a given environment, comprising the implementation of the steps of:
(a) measurement, by a plurality of sensors (13), of a set of values of physical parameters relating to the cooling tower (2), at least one of which being an endogenous parameter specific to the operation of the cooling tower (2) and at least one exogenous parameter specific to said environment;
(b) calculation, by data processing means (11), of at least one expected optimum value of said endogenous parameter as a function of said values of the physical parameters and a model;

(Continued)

(c) determination, by the data processing means (11), of at least one potentially deficient function of the cooling tower (2) as a function of the disparity between the measured value and the expected optimum value of said endogenous parameter and/or the variation of said disparity;

(d) testing, by the data processing means (11), of each function of the cooling tower (2) determined as being potentially deficient; and (e) triggering of an alarm, by the data processing means (11), if at least one function of the cooling tower (2) is evaluated as being deficient in the test.

16 Claims, 7 Drawing Sheets

(52) U.S. Cl.
CPC ..... *F28F 2200/00* (2013.01); *F28F 2200/005* (2013.01); *G06F 21/52* (2013.01)

(56) References Cited

U.S. PATENT DOCUMENTS

| | | | |
|---|---|---|---|
| 2011/0276180 A1* | 11/2011 | Seem | F25B 49/027 700/275 |
| 2012/0053898 A1* | 3/2012 | Togano | F25B 1/053 702/182 |
| 2012/0103570 A1* | 5/2012 | Borre | F28B 1/06 165/104.21 |
| 2013/0218483 A1* | 8/2013 | Sawyer | F28F 27/003 702/35 |
| 2013/0220581 A1* | 8/2013 | Herron | C09K 5/10 165/104.28 |
| 2013/0238258 A1* | 9/2013 | Matsuo | F25B 41/04 702/45 |
| 2014/0244051 A1* | 8/2014 | Rollins | B01F 3/04078 700/282 |
| 2015/0185716 A1* | 7/2015 | Wichmann | F01K 23/101 700/287 |
| 2016/0069624 A1* | 3/2016 | Rollins | F04D 25/028 415/122.1 |

OTHER PUBLICATIONS

Electricite De France, "French Preliminary Search Report," FR Application No. 1551439 (dated Feb. 3, 2016) (with English translation cover sheet).

Electricite De France, "International Search Report," PCT Application No. PCT/FR2016/050381 (dated May 3, 2016).

Electricite De France, "Written Opinion," PCT Application No. PCT/FR2016/050381 (dated May 3, 2016).

* cited by examiner

METHOD FOR DETECTING DEFICIENCIES IN A COOLING TOWER OF A THERMAL FACILITY IN OPERATION

GENERAL TECHNICAL FIELD

The present invention relates to a method for detecting deficiencies in a cooling tower of a thermal facility.

PRIOR ART

Electrical power plants known as thermal (this term encompassing nuclear power plants and conventional power plants) use the energy of a hot source to vaporise a heat transfer fluid, typically water.

The steam thus produced is introduced into a turbine where its expansion causes the rotation of a rotor of the turbine, coupled to an alternator which transforms the mechanical energy of the turbine into electrical energy. At the output of the turbine, the steam is condensed in a condenser supplied by a cold source. It returns to the liquid state and this condensate is sent back into the water supply system for a new vaporisation cycle.

For numerous power plants generating high power, the cold source is one or more cooling towers. The function of cooling towers is to evacuate, to the surrounding medium, heat from the condenser by making hot water circulate in an air flow.

With reference to FIG. 1, a cooling tower 2 is often taken to mean an item of equipment comprising a large concrete tower 20 most often having the shape of a hyperboloid. The water to cool, coming from the condenser 3 via a circuit 4 supplied by a pump 40, is conveyed by a pipe inside the tower 20. From this arrival it is dispersed by means of a network of pierced manifolds, then falls by gravity flow onto a honeycomb packing in order to obtain a large contact surface between the liquid and the air. A flow of air circulates in counter current. Part of the water is going to evaporate, which favours the exchange of heat and improves the cooling of the water. To compensate this evaporation and to avoid species dissolved in the cooling water becoming too concentrated, a complement of cold water is supplied by a make-up circuit 5 withdrawing water from a river. A bleed circuit 6 makes it possible to return the overflow of water that flows therefrom to the river.

Cooling towers provide satisfaction, but prove to be a critical element of a thermal power plant. Indeed, a deficiency (and, in a general manner, a loss of efficiency) of the cooling tower leads to a very important loss in the output of the power plant and thus of electrical production, or even an emergency shut down for reasons of safety if the cooling tower is no longer capable of evacuating sufficient heat.

It is known to carry out tests comprising the verification of physical parameters of the cooling tower, but existing solutions only highlight a loss of efficiency of the cooling tower. In addition, it is observed that these performances are highly dependent on environmental conditions (wind, temperature of the air or river, etc.).

Moreover, standards such as the EN 14705 (currently being replaced by the ISO 16345) and CTI ATC 105 propose protocols for carrying out ad hoc thermal performance tests. These tests, of a duration of around one week, imply the implementation of extensive and costly logistics for managing all of the phases of the test: displacement on site, mounting of acquisitions, dismantling, analysis. Which is why this solution is never in practice implemented for monitoring the evolution of performance over time. Performance tests are in the best of cases only carried out before and after a serious maintenance intervention or in the event of suspicion of dysfunction.

It would be desirable to have a technical solution making it possible to monitor efficiently and objectively the evolution of the performance of cooling towers, so as to enable the rapid or even anticipated detection of failures in operation, the identification of their origin and the quantification of the associated losses, or to plan maintenance operations.

The invention improves the situation.

DESCRIPTION OF THE INVENTION

The invention proposes according to a first aspect a method for detecting deficiencies in a cooling tower of a thermal facility in operation in a given environment comprising the implementation of the steps of:
  (a) Measurement, by a plurality of sensors, of a set of values of physical parameters relating to the cooling tower, at least one of which being an endogenous parameter specific to the operation of the cooling tower and at least one exogenous parameter specific to said environment;
  (b) Calculation, by data processing means, of at least one expected optimum value of said endogenous parameter as a function of said values of the physical parameters and a model;
  (c) Determination, by the data processing means, of at least one potentially deficient function of the cooling tower as a function of the disparity between the measured value and the expected optimum value of said endogenous parameter and/or the variation of said disparity;
  (d) Testing, by the data processing means, of each function of the cooling tower determined as potentially deficient;
  (e) Triggering of an alarm, by the data processing means, if at least one function of the cooling tower is evaluated as being deficient in the test.

The device according to the invention is advantageously completed by the following characteristics, taken alone or in any technically possible combinations thereof:
  each measured physical parameter is selected from the set of physical parameters listed in the ISO 16345 standard;
  a measured endogenous parameter is the temperature at the outlet of the cooling tower of a heat transfer fluid to cool;
  the thermal facility is a thermal power plant having a condenser, said heat transfer fluid to cool being water from a circuit placing the cooling tower in thermal exchange with the condenser;
  at least six exogenous parameters are measured of which:
    The temperature of the air at the inlet of the cooling tower;
    The relative humidity of the ambient air;
    The atmospheric pressure;
    The ambient wind velocity;
    The temperature at the inlet of the cooling tower of a heat transfer fluid to cool;
    The flow rate of said heat transfer fluid.
  step (a) comprises the application of at least one validity and/or stability filter on the measured values so as to only take into account measurements conforming to the filter;

the application of a validity and/or stability filter on the measured values comprises the verification that at least one physical parameter has a value and/or a derivative below a given threshold;

step (b) comprises the correction of said expected optimum value of the endogenous parameter as a function of data relative to prior measurements of values of physical parameters relating to the cooling tower of a reference data base stored in the data storage means;

step (c) comprises the storage of said values measured at step (a) of the physical parameters relating to the cooling tower if no function of the cooling tower is determined at step (c) as being potentially deficient;

step (c) comprises the periodic calculation of a mean value over a given time interval of the disparity between the measured value and the expected optimum value of said endogenous parameter;

the variation in the disparity between the measured value and the expected optimum value of said endogenous parameter is defined at step (c) as the difference between two consecutive mean values of said disparity, step (c) comprising the comparison of this difference with a plurality of predetermined thresholds;

said at least one potentially deficient function of the cooling tower is determined at step (c) as a function of the thresholds exceeded or not by:
said difference between two consecutive mean values of said disparity between the measured value and the expected optimum value of said endogenous parameter; and/or
the current mean value of said disparity;

a deficiency of at least one function of the cooling tower is determined as:
possible if said difference between two consecutive mean values (ETOAJ) of said disparity between the measured value and the expected optimum value of the outlet temperature exceeds 0.5° K;
very probable if said difference between two consecutive mean values (ETOAJ) of said disparity between the measured value and the expected optimum value of the outlet temperature exceeds 2° K;

step (c) also takes into account the value of at least one exogenous parameter to determine which function is potentially deficient.

According to a second aspect, the invention relates to a system for detecting deficiencies in a cooling tower of a thermal facility in operation in a given environment comprising:
a plurality of sensors measuring a set of values of physical parameters relating to the cooling tower, at least one of which being an endogenous parameter specific to the operation of the cooling tower and at least one exogenous parameter specific to said environment;
data processing means configured to implement:
a module for calculating, as a function of said values of the physical parameters and a model, at least one expected optimum value of said endogenous parameter;
a module for determining at least one potentially deficient function of the cooling tower as a function of the disparity between the measured value and the expected optimum value of said endogenous parameter and/or the variation of said disparity;
a module for testing each function of the cooling tower determined as potentially deficient;
a module for triggering an alarm if at least one function of the cooling tower is evaluated as being deficient in the test.

According to advantageous characteristics:
the system further comprises data storage means storing a reference data base of prior measurements of values of physical parameters relating to the cooling tower.

According to a third aspect, the invention relates to a thermal facility comprising at least one cooling tower and a system according to the second aspect for detecting deficiencies in said cooling tower.

According to advantageous characteristics:
the facility is a thermal power plant for the production of electricity.

DESCRIPTION OF THE FIGURES

Other characteristics, aims and advantages of the invention will become clear from the description that follows, which is purely illustrative and non-limiting, and which should be read with regard to the appended drawings, among which.

DETAILED DESCRIPTION

Principle of the Invention

Figure 1:
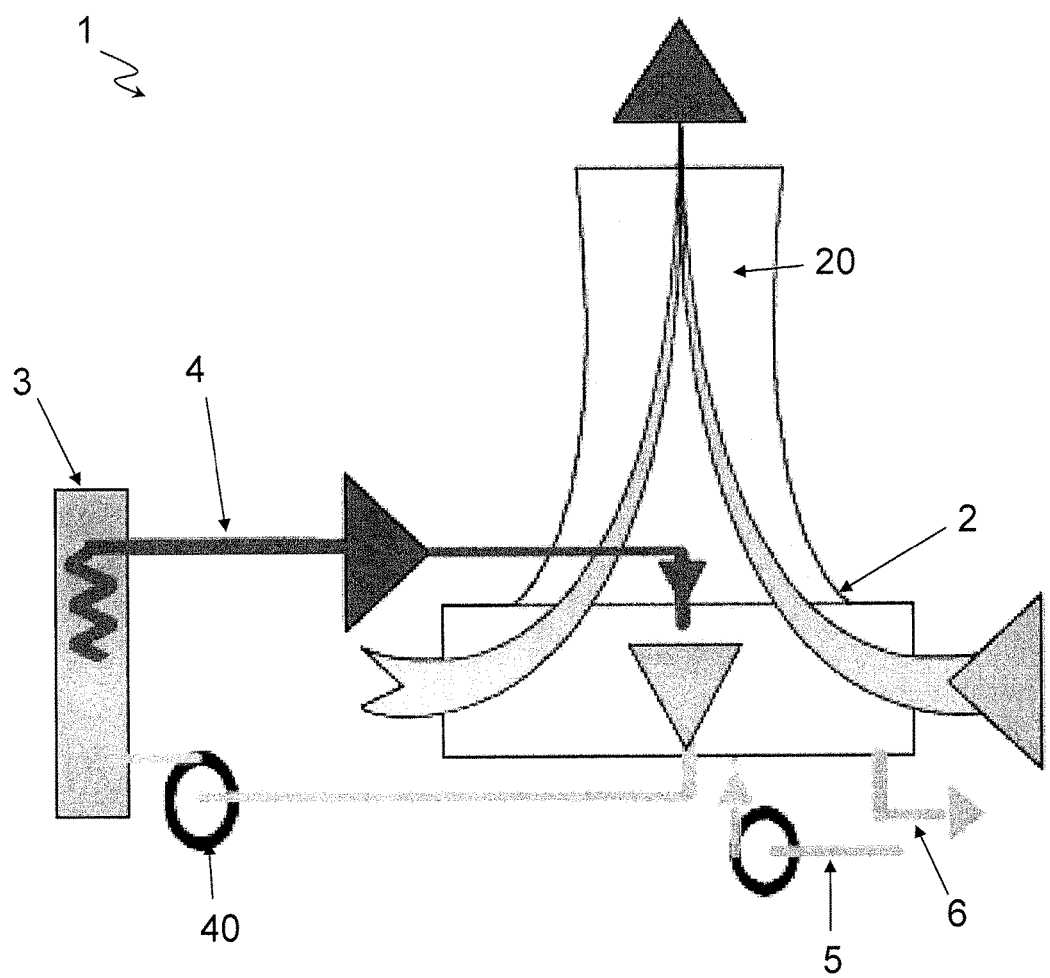
FIG. 1 described previously is a diagram of a thermal power plant with cooling tower.
Figure 2:
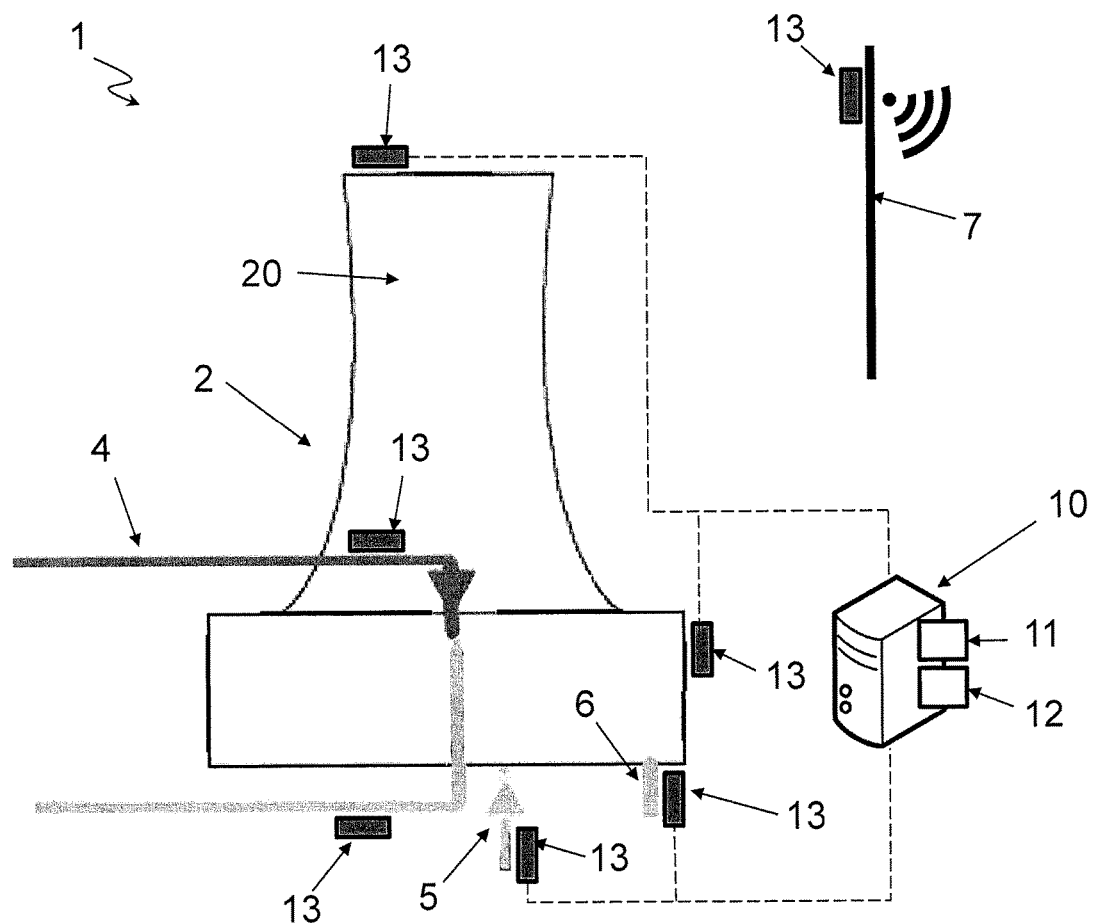
FIG. 2 is a diagram representing the integration of a system for detecting deficiencies in a cooling tower of a thermal power plant for the implementation of the present method for detecting deficiencies in the cooling tower in operation in a given environment.

With reference to FIG. 2, the invention proposes a method for detecting deficiencies in a cooling tower 2 of a thermal facility 1 in operation in a given environment. The cooling tower 2 is configured to cool a heat transfer fluid of the facility 1. This method is conceived to be implemented continually throughout the life of the cooling tower 2, and not only during a test campaign.

In a preferred manner (and this example will be used in the remainder of the description), the facility 1 is a thermal (electrical) power plant, in particular a conventional or nuclear power plant, but it will be understood that the facility 1 may be any industrial infrastructure requiring a dissipation of energy. Alternatively to power plants, the thermal facility 1 may for example be a petrochemicals site, a foundry, a data centre, etc.

Similarly, the present method does not only relate to cooling towers of natural draft type (which are the well know cooling towers used for nuclear power plants), in so far as numerous cooling towers exist that do not have this shape and for which the flow of air is created by fans. In the remainder of the present description, the non-limiting example will be taken of a cooling tower 2 with natural, counter-current draft for which the heat transfer fluid to cool is water from a cooling circuit 4 of a condenser 3. Atmospheric air rises inside the tower and water from the circuit 4 runs down it and descends.

The method is implemented thanks to a system 10 for monitoring the performances of the cooling tower, coupled thereto.

The system 10 is composed essentially of data processing means 11 such as a processor, data storage means 12 such as a memory (for example a hard disc) storing a reference data base relative to past tests (see later), and a network of sensors 13. Each sensor 13 measures the values of one or more physical parameters relating to the cooling tower 2. The data processing means 11 and the data storage means 12 are generally those of a work station, typically provided with an input and output interface to reproduce the results of the method (and, if need be, to trigger an alarm, in a visual or audible manner, in the event of a current or imminent deficiency detected). Alternatively, the data processing means 12 may be those of a remote server connected to the remainder of the system 10 by an internet type network.

As will be seen hereafter, some of these physical parameters are known as "endogenous", that is to say that they are specific to the operation of the cooling tower 2, they are parameters for which the value is a "consequence" of the state of the cooling tower 2. In the remainder of the present description, it will be assumed that a single exogenous parameter is studied, in this particular case the "outlet temperature", that is to say the temperature of the water of the circuit 4 at the outlet of the cooling tower 2. It will be understood that other endogenous parameters may be chosen, for example the flow rate of water evaporated by the cooling tower 2. It may be noted that a combination of two endogenous parameters may be used, such as the ratio of flow rate of incoming water over the flow rate of incoming air. Other physical parameters are known as "exogenous", that is to say that they are specific to said environment of the cooling tower 2. This definition must be taken in the wide sense, and exogenous parameter is taken to mean any parameter for which the value is a "cause" of the state of the cooling tower 2, i.e. having an influence on the value of the endogenous parameter(s). The exogenous parameters are either parameters directly controlled by the operator (for example the thermal power produced by the power plant or the flow rate of water injected via the make-up circuit 6), or purely external parameters such as the wind velocity or the temperature of the ambient air. It is to be noted that as a function of the model chosen, certain endogenous parameters may become exogenous and vice versa (for example the endogenous parameter of a model may be "set" and become a control parameter, whereas another parameter set beforehand becomes a consequence of the others, i.e. an endogenous parameter)

In the remainder of the present description, the wind velocity will be taken as main example of exogenous parameter, but the following could be cited:
the wind direction,
the humidity of the ambient air,
the temperature of the ambient air,
the pluviometry,
the atmospheric pressure,
the temperature of the air at the inlet of the cooling tower 2,
the temperature of the hot water at the inlet of the cooling tower 2,
the temperature of the bleed water,
etc.

Generally, it will be understood that the system 10 comprises a network of sensors 13 connected with or without a wire to the data processing means 11. As may be seen in FIG. 2, the power plant 1 may be equipped with a meteorological mast 7 (optimally arranged at a distance of between 500 m and 2 km from the cooling tower 2) at the top of which are installed one or more sensors 13 measuring the values of physical parameters linked to the climate (wind velocity and direction, pluviometry, temperatures, etc.). Typically, twenty or so sensors 13 measure at regular intervals as many physical quantities. In a preferred manner, the quantities measured will be chosen among those listed in the EN 14705/ISO 16345 standard.

Method—Calculation of the ETOA

The present method for detecting deficiencies in a cooling tower 2 of a thermal power plant 1 in operation in a given environment begins by the implementation by the sensors 13 of a step (a) of measuring a set of values of physical parameters relating to the cooling tower 2, at last one of which being an endogenous parameter specific to the operation of the cooling tower and at least one exogenous parameter specific to said environment. As explained, this measuring step may be done at regular intervals. The values acquired are transmitted to the data processing means 11.

The acquisition of the value of each of the parameters may be carried out at regular interval, for example every minute (or even several times a minute or every second). Over a time interval (for example ten minutes, but durations from one minute to one hour give good results), the different values acquired may be locally averaged out in such a way as to constitute what is called a test. A test is consequently defined as a vector of the values of the parameters averaged out over a small number of consecutive measurements. Assuming that a test is obtained every ten minutes, more than one hundred tests per day may thus be made available. It will be understood that this notion of a test grouping together a plurality of measurements is not restrictive and that each instant of measurement may be treated independently (like a test) in the remainder of the method.

Each test is not necessarily reliable, and in a preferred manner step (a) comprises the verification of the measured values before taking into account the test. In other words, a set of stability and validity conditions of the data are verified.

To do so, one or more filters are implemented (stability and/or reliability) so as to only take into account measurements conforming to the filter (i.e. relevant for characterising the performance of the cooling tower 2). For example, the following are excluded:
measurements having shown a too high variation over a given period of time (for example more than 5% over one hour),
certain exogenous parameters that have too high values (for example wind of more than 4 m·s$^{-1}$).

Certain more complex filters (going further than a simple comparison of the value or the derivative with a threshold may be implemented), such as the verification of a sufficient time from the last peak (used for example for the wind).

If the measurement is excluded, the test is considered as "invalid" and is not taken into account. Only the tests kept will then be treated in the remainder of the method.

It is to be noted that the thresholds associated with the filters are adjustable to find the best compromise so as to have sufficient tests kept to have the best accuracy in the result, without all the same keeping tests that are potentially less reliable. For example, on a windy site, the threshold on the wind velocity could be increased or even deleted.

In a second step (b), the data processing means 11 calculate, as a function of said values of the physical parameters and a model, at least one expected optimum value of said endogenous parameter. Optimum value is taken to mean the theoretical value that this endogenous parameter should have in the absence of deficiencies of the cooling tower 2. A slight disparity with this expected value will be of the order of normal fluctuations, but a greater disparity will be the sign of a deficiency, as will be seen hereafter.

In the case where the endogenous parameter is the outlet water temperature, said expected optimum value is called the TOA (expected optimum temperature). The difference between the TOA and the outlet temperature actually measured as endogenous parameter is called the ETOA (TOA disparity).

It may be noted that the relative disparity (i.e. the ratio) may be estimated rather than the real disparity. This is what is for example proposed if the endogenous parameter is the flow rate of evaporated water. The ratio of the theoretical flow rate of evaporated water over the optimum flow rate of evaporated water is called the "capability" of the cooling tower.

The model used is a physical model based on thermodynamic equations or performance curves describing the expected operation of the cooling tower 2. This model is either available as of the design of the thermal power plant 1, or updated following the last renovation of the cooling tower 2. As an example, the following could be used:

Merkel's law given by the equation:

$$Me = C\left(\frac{Qma}{Qte}\right)^n$$

$$\text{Where} = \int_{T2}^{T2+Dte} \frac{Cpe}{(hs-h)} dT,$$

with $Q_{ma}$ the air mass flow, $Q_{me}$ the water mass flow, $T_2$ the outlet water temperature, h the enthalpy of air, $h_S$ the enthalpy of the air saturated at the temperature of the water, $C_{pe}$ the specific heat of water, Dte is the temperature disparity (i.e. $T_2$+Dte is the inlet temperature);

The head loss equation:

$$\rho_1 - \rho_2 = \frac{1}{2}\frac{\rho_1}{gH} C_f \cdot V_D^2,$$

with $\rho_1$ and $\rho_2$ the density of the air at the inlet and at the outlet of the cooling tower 2, H the draft height, g the acceleration due to gravity and $V_D$ the wind velocity.

C, n and $C_f$ are constants that can be supplied by the manufacturer during commissioning approval tests of the cooling tower or instead they are calculated from the first months of data acquired by the system.

Figure 3:
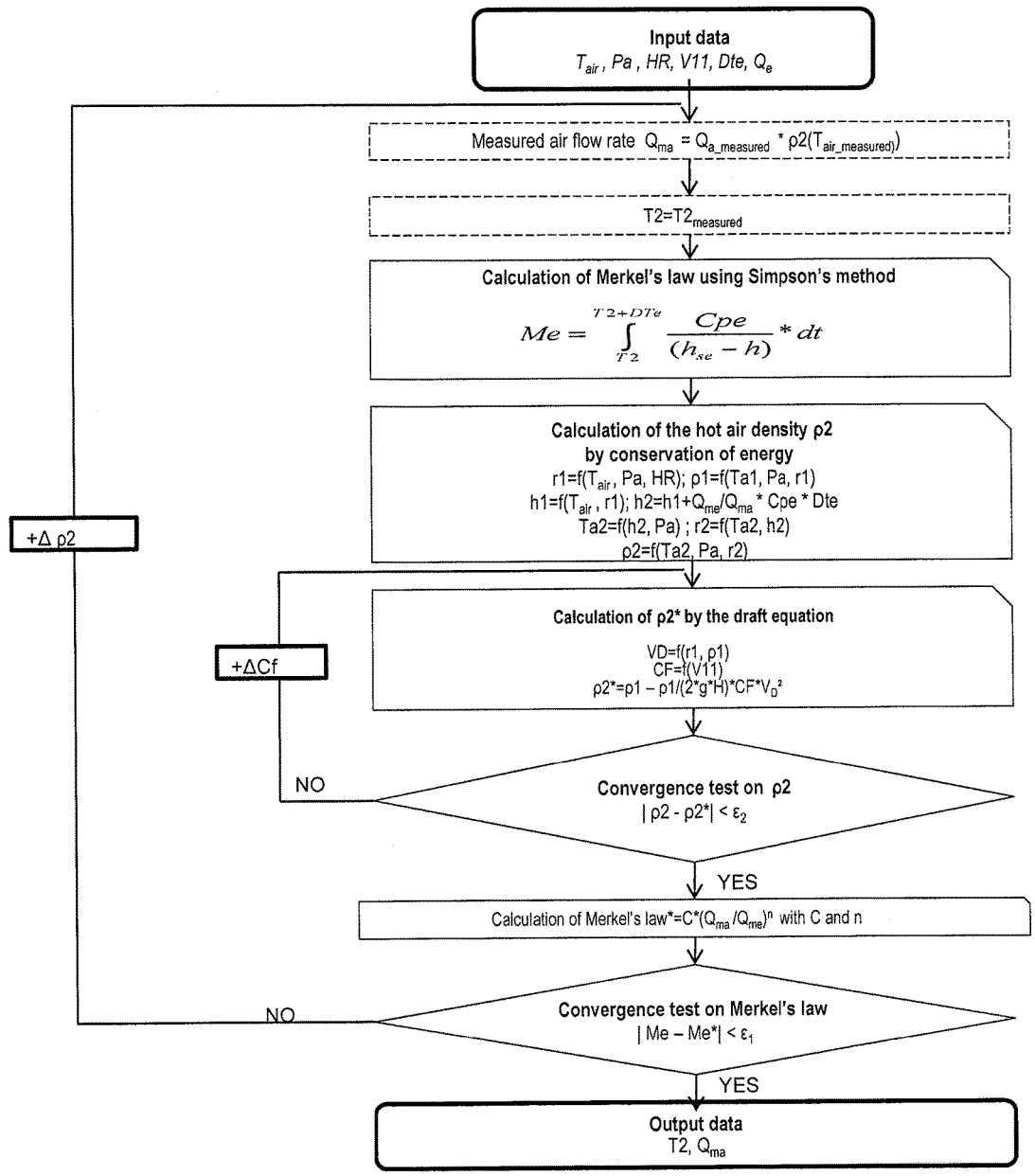
FIG. 3 schematically represents a model making it possible to calculate an expected optimum temperature at the outlet of the cooling tower during the implementation of the method according to the invention.

With reference to FIG. 3, using these equations, the TOA as endogenous parameter may be estimated as a function of these values of six exogenous parameters:

The temperature of the air at the inlet $T_{air}$;
The relative humidity of the air at the inlet HR;
The wind velocity $V_D$;
The ambient pressure $P_a$;
The flow rate of water circulating in the circuit 4 $Q_e$;
The difference in water temperature between the output and the input Dte (in practice, the exogenous parameter is the inlet temperature, from which the outlet temperature is subtracted).

Certain parameters may moreover be used, such as the temperature of the make-up water (on the circuit 6) and the wind direction.

It is to be noted that, alternatively, some of these parameters may be set as constants.

FIG. 3 represents an iterative algorithm that makes it possible, after a certain number of iterations (varying the values of Qma (the mass air flow) and T2 (the outlet temperature)), to resolve the above equations and to obtain the TOA T2. It will be understood that the invention is in no way limited to this algorithm, which is only one possibility among others.

In a preferred manner, the system 10 comprises data storage means 12 storing a data base of prior tests. It will be assumed that the data base takes into account both:

nominal tests, that is to say that, on the one hand, they are compliant with the aforementioned potential stability/validity filtering and that, on the other hand, it has been found that no deficiency affected the cooling tower 2 during this test); and non-nominal tests, that is to say for which a problem either of measurement (deficient sensor) or of value (potential deficiency of the cooling tower 2) is identified. These non-nominal tests offer a lot of information that could be exploited to improve the facility 1.

Figure 4A:
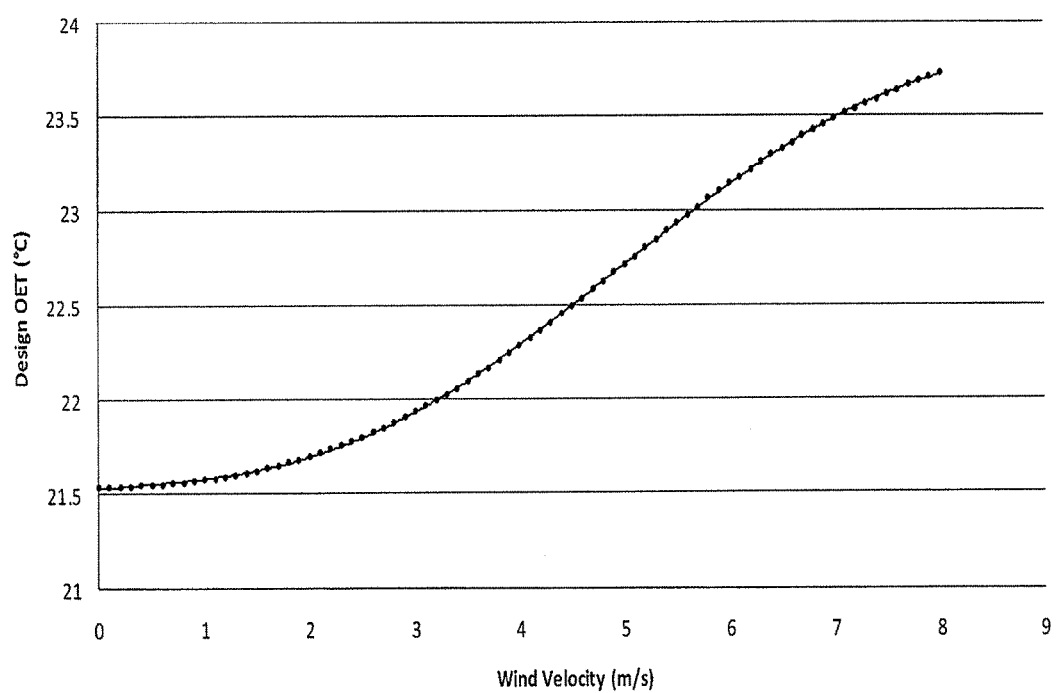
FIGS. 4a-4c are three examples of curves illustrating the evolution of the theoretical or real expected optimum temperature, or the disparity between these two values as a function of the wind velocity.
Figure 4B:
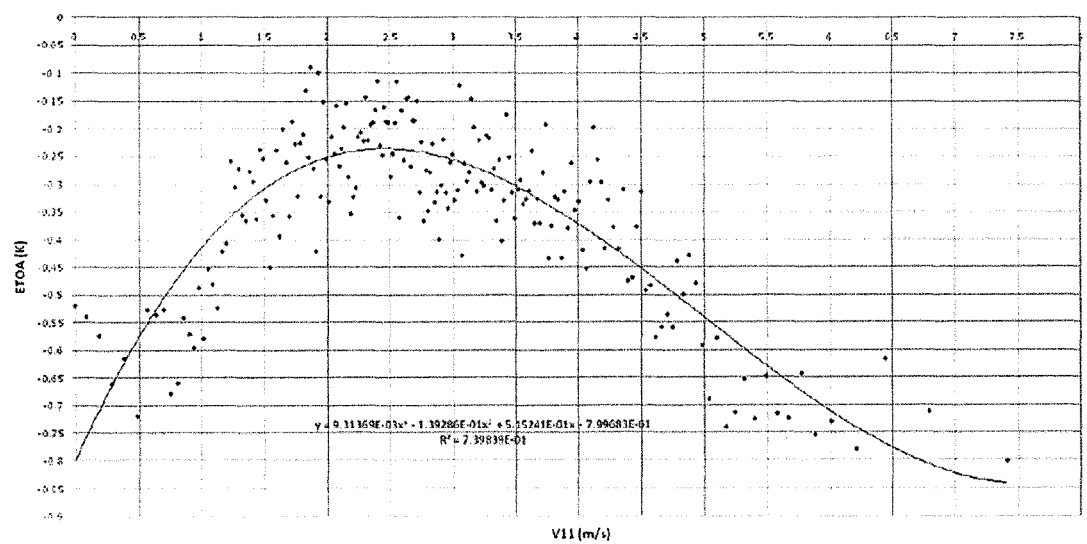
Figure 4C:
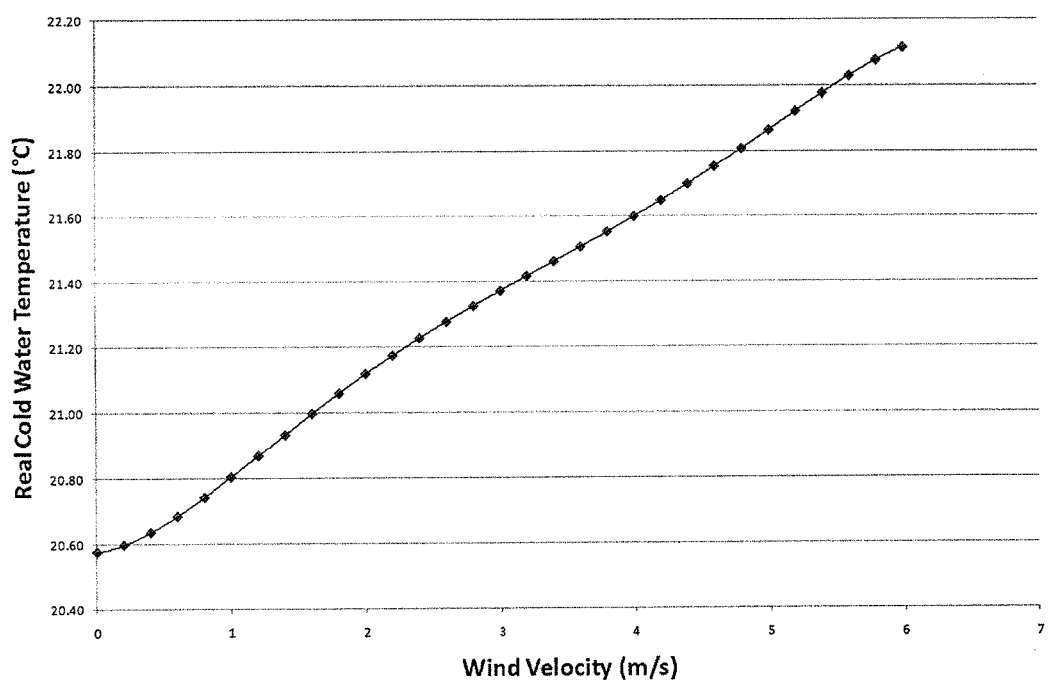

The taking into account of these prior tests makes it possible to refine the calculated value of the expected optimum value, in the manner that may be seen in FIGS. 4a-4c.

The latter represent the example of the effect of wind on the expected optimum temperature (in particular, FIG. 4a represents the "theoretical" TOA as a function of the $V_0$, placing nominal values for all the other parameters so as to have available a function in dimension 1).

The idea is that the purely theoretical taking into account of the wind effect is not sufficient, because it omits details such as the presence of obstacles around the cooling tower (the machine room, other cooling towers, etc.). FIG. 4b thus represents a cloud of points each representing a prior test, giving the ETOA, that is to say the TOA disparity obtained, for a wind velocity value measured during the test.

By extrapolation, a correction function can be obtained. The curve 4c represents the "experimental" TOA (that is to say the theoretical curve corrected with real data) as a function of the $V_D$, corresponding to the sum of the curves of FIGS. 4a and 4b.

At the end of step (b), the theoretical optimum value of the studied parameter (typically the TOA) and/or the disparity between this theoretical value and the measured value (typically the ETOA) is available. It is going to be possible to deduce therefrom current or imminent potential deficiencies of the cooling tower 2.

Method—Determination of Deficiencies

In a step (c), the data processing means 11 determine at least one potentially deficient function of the cooling tower 2 as a function of the disparity between the measured value and the expected optimum value of said endogenous parameter and/or the variation of said disparity (which is called the drift speed). As explained, the deficiency may be current (technical problem requiring an urgent intervention) or future (imminent or in the longer term, i.e. an anomaly requiring a short or medium term maintenance to be planned, because it degrades little by little the performances of the cooling tower 2 is detected).

To do so, in an advantageous manner the data processing means 11 begin by aggregating the ETOA obtained over a time interval, for example one day, and by calculating an arithmetic mean (then known as ETOAJ).

Figure 5:
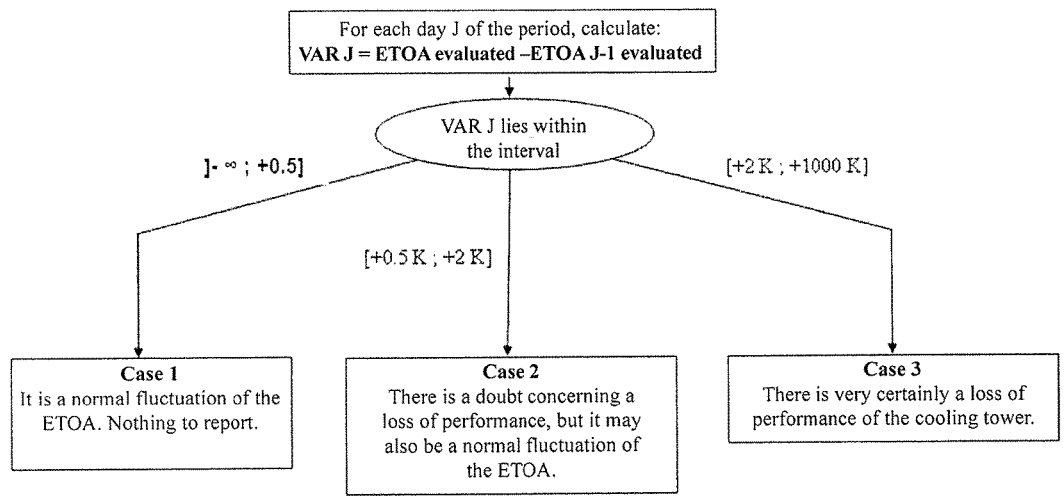
FIG. 5 is a diagram representing a detail of an embodiment of step (c) of the method according to the invention.

VAR J denotes the variation in two consecutive ETOAJ. With reference to FIG. 5, this value of variation in the ETOAJ is compared to a plurality of thresholds:

If VAR J<0.5K, then the fluctuation is normal;
If 0.5K>VAR J>2K, then there is a doubt;
If VAR J>2K, then a failure of the cooling tower 2 is strongly suspected.

In cases 2 and 3, the failure of a function of the cooling tower is explored. Among potentially faulty functions may be cited:

By-pass valve left open;
Overflow from the hot water basin (cross currents);
Overflow from the water tower (counter current),
Numerous solid streams,
Return to complete dispersion not satisfactory after sectorisation;
Unjustified frost-protection operation;
Etc.

As a function of the value of VAR J and especially of ETOAJ (the higher the ETOAJ, the greater the drop in performance) certain functions may be suspected more than others. The value of certain parameters may also be used.

For example, the frost protection mode is mainly suspected when firstly a very high VAR J is detected concomitant with a continuous drop in air temperature close to 0° C. ("normal" frost protection mode) followed by a rise in air temperature with VAR J close to 0 (frost protection mode remaining blocked).

Automatic filters thus make it possible to suspect certain functions and to envisage either a local technical intervention (minor problem such as a by-pass valve left open), or to plan/prioritise a maintenance intervention (case of much slower but persistent drifts).

In all cases, a step (d) comprises the implementation of a test of each function of the cooling tower 2 determined as potentially deficient, so as to see if the suspicion was justified. This step may either be implemented by computer, via a test routine, or by requesting an intervention by a technician (and the confirmation on the system 10 of the suspicion of deficiency).

If need be, a step (e) is implemented of triggering an alarm, by the data processing means 11, if at least one function of the cooling tower 2 is evaluated as being deficient in the test. The alarm may be a visual signal (for example via a colour code, in particular red if the solution is an urgent intervention), or a notification of a potential problem in the longer term if the solution is a maintenance operation.

The type of alarm implemented by the means 11 may depend on the function identified as deficient.

It will be noted that the present method enables:
On the one hand, to avoid stoppages (accidental or even urgent) of a unit of an electrical power plant in the event of an anomaly, since local technical interventions may be triggered rapidly,
On the other hand, to optimise maintenance operations (which are traditionally carried out at predetermined moments rather than when they are necessary);
but further to propose an alternative to a drop in head in the case of certain anomalies such as a scaling crisis.

It is also to be noted that the tests may, as explained, enrich said test data base. In other words, step (c) advantageously comprises the storage of said values measured at step (a) of the physical parameters relating to the cooling tower 2.

It may be noted that the results of potential filters may also be stored in the data base.

System and Power Plant

As a function of a second aspect, the system 10 is proposed for the implementation of the present method for detecting deficiencies in a cooling tower 2 of a thermal power plant 1 in operation in a given environment.

This system 10 for detecting deficiencies in a cooling tower 2 of a thermal power plant 1 in operation in a given environment comprises, as explained, sensors 13, data processing means 1 and advantageously data storage means 12.

The sensors 13 measure (at regular intervals) a set of values of physical parameters relating to the cooling tower 2, at least one of which being an endogenous parameter specific to the operation of the cooling tower 2 and at least one exogenous parameter specific to said environment.

The data processing means 11 are configured to implement:
a module for calculating, as a function of said values of the physical parameters and a model, at least one expected optimum value of said endogenous parameter;
a module for determining at least one potentially deficient function of the cooling tower 2 as a function of the disparity between the measured value and the expected optimum value of said endogenous parameter and/or the variation of said disparity;
a module for testing each function of the cooling tower 2 determined as potentially deficient;
a module for triggering an alarm if at least one function of the cooling tower 2 is evaluated as being deficient in the test.

The data storage means 12 store a reference data base of prior measurements of values of physical parameters relating to the cooling tower 2.

According to a third aspect, the thermal facility 1 (typically the electrical power plant, in particular conventional or nuclear) is proposed comprising a system for detecting deficiencies of at least one of its cooling towers 2, of the type of that represented in FIG. 2.

The invention claimed is:

1. Method for remedying deficiencies in a cooling tower of a thermal facility in operation in a given environment comprising the implementation of the steps of:
(a) Measurement, by a plurality of sensors, of a set of values of physical parameters relating to the cooling tower, at least one of which being an endogenous parameter specific to the operation of the cooling tower and at least one exogenous parameter specific to said environment;
(b) Calculation, by a data processor, of at least one expected optimum value of said endogenous parameter as a function of said values of the physical parameters and a model;
(c) Determination, by the data processor, of at least one potentially deficient function of the cooling tower as a function of the disparity between the measured value and the expected optimum value of said endogenous parameter and/or the variation of said disparity;
(d) Testing, by the data processor, of each function of the cooling tower determined as potentially deficient;

(e) Triggering of an alarm for intervention on the cooling tower, by the data processor, if at least one function of the cooling tower is evaluated as being deficient in the test;

wherein step (c) comprises the periodic calculation of a mean value over a given time interval of the disparity between the measured value and the expected optimum value of said endogenous parameter; and wherein the variation of the disparity between the measured value and the expected optimum value of said endogenous parameter is defined at step (c) as the difference between two consecutive mean values of said disparity, step (c) comprising the comparison of this difference with a plurality of predetermined thresholds.

2. Method according to claim 1, wherein each measured physical parameter is selected from the set of physical parameters listed in the ISO 16345 standard.

3. Method according to claim 1 or claim 2, wherein a measured endogenous parameter is the temperature at the outlet of the cooling tower of a heat transfer fluid to cool.

4. Method according to claim 3, wherein the thermal facility is a thermal power plant having a condenser, said heat transfer fluid to cool being water of a circuit placing the cooling tower in thermal exchange with the condenser.

5. Method according to claim 1, wherein at least six exogenous parameters are measured of which:
The temperature of the air at the inlet of the cooling tower;
The relative humidity of the ambient air;
The atmospheric pressure;
The ambient wind velocity;
The temperature at the inlet of the cooling tower of a heat transfer fluid to cool;
The flow rate of said heat transfer fluid.

6. Method according to claim 1, wherein step (a) comprises the application of at least one validity and/or stability filter on the measured values so as to only take into account measurements conforming to the filter.

7. Method according to claim 6, wherein the application of a validity and/or stability filter on the measured values comprises the verification that at least one physical parameter has a value and/or a derivative below a given threshold.

8. Method according to claim 1, wherein step (b) comprises the correction of said expected optimum value of the endogenous parameter as a function of data relative to prior measurements of values of physical parameters relating to the cooling tower of a reference data base stored in a data memory.

9. Method according to claim 8, wherein step (c) comprises the storage of said values measured at step (a) of the physical parameters relating to the cooling tower.

10. Method according to claim 1, wherein said at least one potentially deficient function of the cooling tower is determined at step (c) as a function of the thresholds exceeded or not by at least one of:
said difference between two consecutive mean values of said disparity between the measured value and the expected optimum value of said endogenous parameter; and
the current mean value of said disparity.

11. Method according to claim 10, wherein a measured endogenous parameter is the temperature at the outlet of the cooling tower of a heat transfer fluid to cool and a deficiency of at least one function of the cooling tower is determined as:
possible if said difference between two consecutive mean values (ETOAJ) of said disparity between the measured value and the expected optimum value of the outlet temperature exceeds 0.5° K
very probable if said difference between two consecutive mean values (ETOAJ) of said disparity between the measured value and the expected optimum value of the outlet temperature exceeds 2° K.

12. Method according to claim 10, wherein step (c) also takes into account the value of at least one exogenous parameter to determine which function is potentially deficient.

13. System for remedying deficiencies in a cooling tower of a thermal facility in operation in a given environment comprising:
a plurality of sensors measuring a set of values of physical parameters relating to the cooling tower, of which at least one endogenous parameter specific to the operation of the cooling tower and at least one exogenous parameter specific to said environment;
data processor configured to implement:
a module for calculating, as a function of said values of the physical parameters and a model, at least one expected optimum value of said endogenous parameter;
a module for determining at least one potentially deficient function of the cooling tower as a function of the disparity between the measured value and the expected optimum value of said endogenous parameter and/or the variation of said disparity, comprising the periodic calculation of a mean value over a given time interval of the disparity between the measured value and the expected optimum value of said endogenous parameter, wherein the variation of the disparity between the measured value and the expected optimum value of said endogenous parameter is defined as the difference between two consecutive mean values of said disparity, determining at least one potentially deficient function comprising the comparison of this difference with a plurality of predetermined thresholds;
a module for testing each function of the cooling tower determined as potentially deficient;
a module for triggering an alarm for intervention on the cooling tower if at least one function of the cooling tower is evaluated as being deficient in the test.

14. System according to claim 13, further comprising a data memory storing a reference data base of prior measurements of values of physical parameters relating to the cooling tower.

15. Thermal facility comprising at least one cooling tower and a system according to claim 13 or claim 14 for detecting deficiencies of said cooling tower.

16. Thermal facility according to claim 15, being a thermal power plant for the production of electricity.

* * * * *